United States Patent [19]
Cornsweet

[11] 3,870,415
[45] Mar. 11, 1975

[54] METHOD AND MEANS FOR MEASURING THE REFRACTIVE PROPERTIES OF AN OPTICAL SYSTEM

[75] Inventor: Tom N. Cornsweet, Washington, D.C.

[73] Assignee: Acuity Systems, Incorporated, McLean, Va.

[22] Filed: Oct. 27, 1972

[21] Appl. No.: 301,365

[52] U.S. Cl. ................................ 356/124, 356/128
[51] Int. Cl. ............................................. G01b 9/00
[58] Field of Search .......... 351/6, 13; 356/126, 127, 356/128, 153, 124, 125

[56] References Cited
UNITED STATES PATENTS

| | | | |
|---|---|---|---|
| 3,445,665 | 5/1969 | Laughman | 356/126 |
| 3,524,702 | 8/1970 | Bellows et al. | 351/13 |
| 3,536,383 | 10/1970 | Cornsweet | 351/6 |
| 3,542,475 | 11/1970 | Cooper | 356/125 |
| 3,614,214 | 10/1971 | Cornsweet | 351/13 |
| 3,639,041 | 2/1972 | Cornsweet | 351/13 |
| 3,664,721 | 5/1972 | Roberts | 350/3.5 |
| 3,712,716 | 1/1973 | Cornsweet | 351/6 |
| 3,776,639 | 12/1973 | Stauffer | 356/125 |

Primary Examiner—Ronald L. Wibert
Assistant Examiner—Conrad Clark
Attorney, Agent, or Firm—Cushman, Darby & Cushman

[57] ABSTRACT

Method and means for measuring the refractive properties of an optical system utilizing a rotatable ruling disposed to intercept a refracted light beam passing from the optical system under test. The refracted beam is chopped as a result of relative motion between the refracted light beam and the ruling to produce a series of electrical signal pulses after photo detection of the chopped refracted beam. The train of signal pulses thus produced is analyzed to provide selected quantitative measures of spherical power, cylindrical power, cylindrical axis, prism power and prism axis of the optical system under test.

The light beam incident upon the optical system under test is rotated to trace out a cylindrical surface for measuring the cylindrical power, spherical power and cylinder axis. The resulting refracted light beam will describe an ellipse on the grating in the most general case when all three of these refractive properties are present. The rate at which the incident beam is rotated is much greater than the rate at which the ruling is rotated and the signal pulses produced from the photo detector output are counted during each revolution of the incident light beam. The maximum number resulting from such a counting process is proportional to the major axis of the ellipse and therefore proportional to the spherical power of the lens, while the minimum number thus derived is proportional to the minor axis of the ellipse. The difference between these two numbers is proportional to the cylindrical power of the lens while the angular position of the ruling at the instant when the minimum number is detected is indicative of the relative orientation of the cylinder axis.

The prism power and axis is measured by using a static incident beam of light and then counting the number of signal pulses produced during one complete revolution of the ruling. The number of such pulses is directly proportional to the prism power while the angular position of the ruling at the time the inter-pulse time interval is at a maximum is a measurement of the prism axis.

28 Claims, 5 Drawing Figures

METHOD AND MEANS FOR MEASURING THE REFRACTIVE PROPERTIES OF AN OPTICAL SYSTEM

This invention relates to method and means for measuring refractive properties of optical systems such as spectacle lenses. In the past, such systems have sometimes been referred to as "lensometers" for measuring spherical power, cylindrical power, cylindrical axis, prism power and prism axis which properties are, of course, the principal parameters commonly used for describing many optical systems such as spectacle lenses.

The applicant has other commonly assigned pending applications Ser. No. 301,366 filed Oct. 27, 1972; Ser. No. 270,639 filed July 11, 1971; Ser. No. 361,368 filed Oct. 27, 1972 and will be filling other applications in the future related to the measurement of optical parameters. The applicant also has other already issued patents such as U.S. Pat. Nos. 3,639,041; 3,712,716; 3,614,214; and 3,536,383 related to the measurement of optical parameters using optical-electronic equipment.

The operator of conventional lensometers is required to place the unknown lens in a holder and then to visually examine an optical display typically consisting of two sets of bright lines oriented at right angles to one another. The operator then turns a knob until the lines are optimally focused after which another knob is turned to rotate the lines until one set of lines is sharpest. These two knobs are then operated in an iterative procedure until one set of the lines is as sharp as possible.

After this manual subjective adjustment of a conventional lensometer instrument, the angle of the lines is read from a scale as a measure of the cylinder axis. The reading of another scale at this setting of the instrument provides a measurement for the spherical power of the lens. Thereafter the operator readjusts the first knob until the opposite perpendicular set of lines is sharpest and then rereads the scale from which the spherical power was previously derived. This later reading is subtracted from the earlier spherical power reading to obtain the cylinder power. Prism power and axis are then subjectively measured by estimating the distance and direction respectively through which the point where the lines cross is displaced from the center of the optical display. Such conventional lensometers require about 5 seconds to position the lens in the machine and at least 20 seconds exclusive of hand-writing the results down to make the instrument settings. Furthermore, as those in the art well appreciate, the accuracy of the measurements derived from this kind of lensometer are limited at best because of the many subjective judgments that must be made by the lensometer operator.

While some other prior attempts may have been made to automate parts of the lens measuring process such as the centering of the lens, etc. these attempts have, for the most part, involved complicated techniques and/or subjective interpretations.

Now, however, using the invention to be described below, all or any one of the 5 principal parameters of a lens may be easily and accurately obtained by merely placing the lens within a proper holder and pushing a button. The resultant measurement for any one or all 5 of the parameters will be available in digital form within approximately one second or less.

There are two modes of operation involved in the measurement of all 5 of these parameters. That is, spherical power, cylindrical power and cylinder axis are measured in one mode of operation while prism power and prism axis are measured in another mode of operation.

The first mode of operation for measuring spherical power, cylindrical power and cylindrical axis involves illumination of the optical system under test with an incident beam of light which is rotated about a radius to describe or sweep out a cylindrical surface. That is, the incident beam of light in the first mode of operation is in rotation such that it approximately describes a circle in the plane of the test optical system. As those in the art should appreciate, if all three of these lens parameters are non-zero, the resultant refracted beam of light will describe the surface of an elliptical cone (i.e., an ellipse on any plane perpendicular to the optical axis of the system). To insure that this ellipse is never smaller than some minimum, a negative powered lens of known power is included in combination with the unknown lens such that the resultant lens power is usually negative when lenses within the range of the instrument are inserted for tests.

Both the refracted light beam and a ruling are rotated about an axis, but at different speeds.

The rotating grating or ruling is placed in the path of this refracted light such that the refracted beam sweeps out an ellipse on the surface of the grating. The major axis of this ellipse is then proportional to the spherical power of the lens while the difference between the major and minor axes of the ellipse is proportional to the cylindrical power of the lens. The longer axis or major axis of the ellipse will be parallel to the cylindrical axis of the test lens as should now be appreciated by those in the art.

Actually the minor axis of the ellipse (power in a plane perpendicular to the cylinder axis) is sometimes used as a measure of the spherical power too. Accordingly, although the following description describes the spherical power as being a function only of the major axis, it should be understood that the minor axis could also be used as the spherical power indicator if this definition or convention is to be employed. The spherical power is also sometimes defined to be an "equivalent sphere" as an average of the major and minor axes as should be apparent to those in the art.

The relative speeds of rotation for the incident light beam and the ruling are such that the incident light beam revolves much faster than the ruling. Accordingly, for any given single rotation of the incident light beam, the ruling may be considered to be relatively fixed at some given angular orientation. In the exemplary embodiment to be described in more detail below, the ruling consists of alternate bands of opaque and transparent lines such that the refracted beam is alternately blocked and passed by the ruling as it sweeps out the elliptical shape in the plane of the ruling. A photo detector assembly is mounted to gather and detect light which is transmitted by the ruling thus producing a series of electrical signal pulses as the refracted light sweeps out the ellipse upon the grating.

As should now be apparent upon considering this system, the number of pulses produced when sweeping out an ellipse when the major axis of the ellipse is aligned with the lines of the ruling will be some minimum number of pulses while the number of pulses produced when the minor axis of the ellipse is aligned with the ruling will be a maximum number. The maximum and minimum numbers of pulses thus derived will, of course, be a direct relative measurement of the lengths of the major and minor axes of the ellipse respectively.

The larger of these numbers may be taken directly (together with an appropriate constant of proportionality) as the spherical power of the lens while the difference between the maximum and minimum numbers thus derived (together with a constant of proportionality) may be taken as a direct measurement of the cylindrical power of the lens. As should now be apparent, the relative angular positioning of the rotating ruling at the point in time when the maximum or minimum numbers are detected (and thus when the major or minor axes of the ellipse are aligned with the ruling lines) may be taken as a direct indication of the relative orientation of the cylinder axis.

In the second mode of operation, the prism power and prism axis is measured. Here, a static beam of light is directed along the axis of the instrument, and, if prism power is present in the test system, this static beam of light will be deflected by a certain amount. Accordingly, as the ruling rotates through one complete revolution, a certain number of pulses will be produced which number will be directly proportional to the angle of deviation or, in other words, the prism power. Furthermore, the inter-pulse time interval occurring between successive ones of the signal pulses will vary as a function of the angular position of the ruling with respect to the direction of prism deviation or in other words the prism axis. Accordingly, by detecting the inter-pulse time interval and noting the relative angular position of the ruling when this inter-pulse interval is at a maximum or minimum, one may obtain a direct relative measurement of the prism axis of the test optical system.

A special purpose digital computing apparatus is disclosed herein for automatically making these various computations mentioned above and for providing any one or all of the 5 lens parameters as digital displays. Of course, those in the art will appreciate that once the basic data is gathered, it might also be input to conventional general purpose computing apparatus under appropriate program control to result in the same or equivalent calculations to eventually result in appropriate determination of any one or all 5 of the lens parameters previously discussed.

Furthermore, the optical center of the lens and/or axes of the cylinder and prism may also be automatically marked on the test lens itself with conventional servo driven marking systems utilizing the resulting lens parameter measurements obtained with this invention.

The many objects and advantages of this invention will be better appreciated by reading the following detailed description together with the accompanying drawings of which: filing FIG. 1 is a schematic depiction of one exemplary embodiment of apparatus for practicing the invention;

Figure 1:
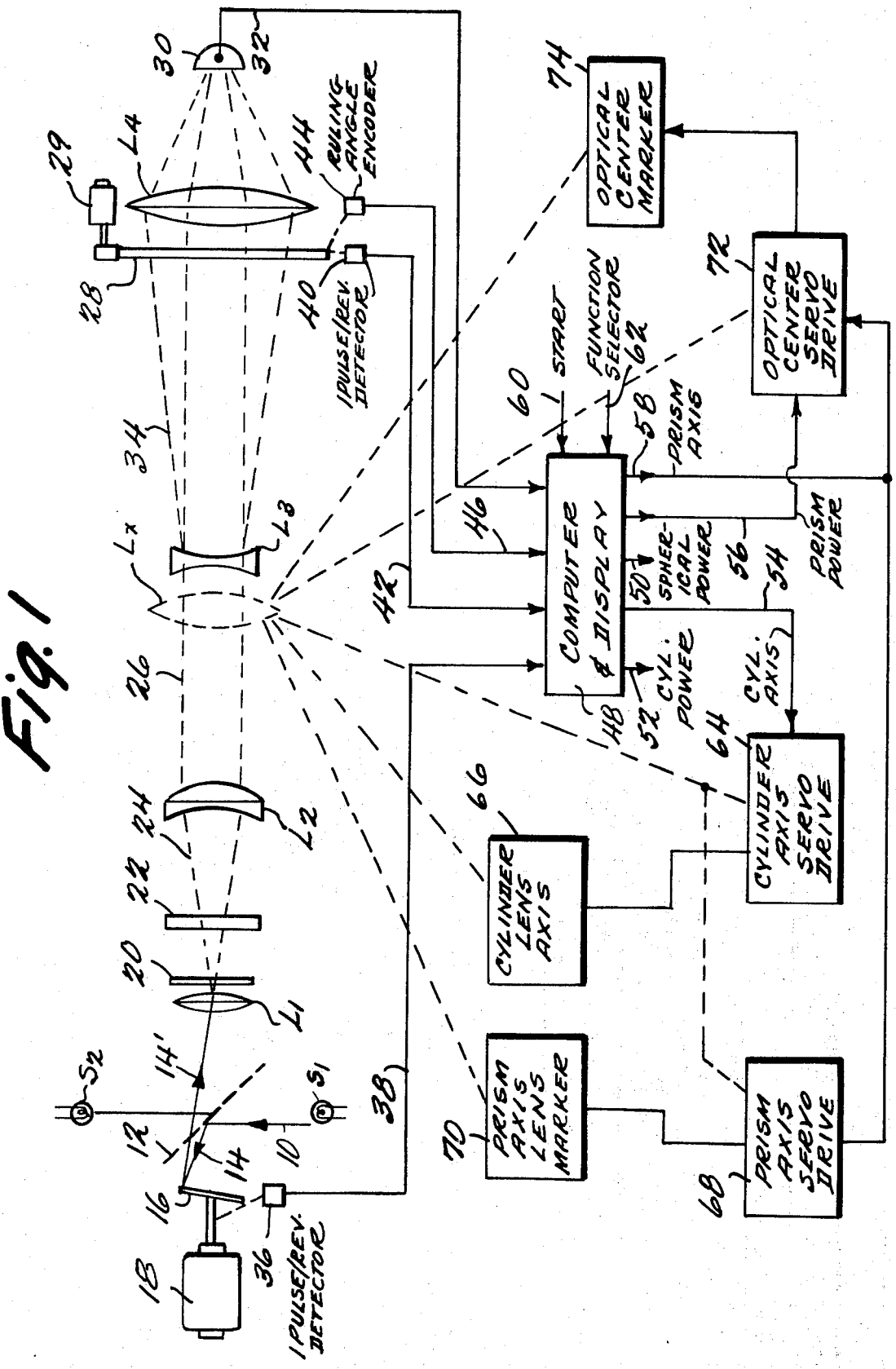

Referring now to FIG. 1, $S_1$ represents a very small source of light. A beam of light 10 is directed onto a partially silvered mirror 12 from which it is reflected along path 14 towards a rotating mirror 16. The mirror 16 is rotated by a motor 18 at a high rate of speed (e.g., 6,000 rpm). The reflecting plane of the mirror 16 is not precisely perpendicular to the rotational axis of the motor shaft but rather, makes a small angle with respect to such a perpendicular. Accordingly, as should now be apparent, the light reflected back along path 14' towards the half-silvered mirror 12 will have a rotational component imparted to it by the mirror 16. This reflected light then passes along path 14' through the half-silvered mirror 12 and passes on through the lens $L_1$.

The distance over which light travels from $S_1$ to the lens $L_1$ is chosen to approximately equal the focal length of $L_1$ such that the rotating light beam refracted by $L_1$ is a collimated beam of light. A portion of this rotating collimated light beam is passed by an aperture in the stop 20 and filter 22 on through lens $L_2$ which is chosen to form an image of $S_1$ in its focal plane. Of course, because the mirror 16 is rotating about an axis other than perpendicular to its reflecting surface, the image of $S_1$ will rotate about a circle in a focal plane of $L_2$.

The aperture in stop 20 is chosen to be quite small and to be located within the left hand focal plane of $L_2$, as seen in FIG. 1. The filter 22 passes green light only so that the subsequent measurements will take into account the appropriate chromatic properties of the unknown lens $L_x$. That is, the focal length and prism power of any lens depends upon the wave length of the light used to measure these parameters and since spectacle lenses are used to correct vision which is most sensitive to green light, green light has been chosen as most appropriate for the measurement of thesse parameters in the exemplary embodiment with respect to spectacle lenses. Of course, as those in the art will appreciate, other filters 22 might be used to pass different colors of light if other chromatic properties of a test lens were desired.

The unknown lens $L_x$ and a known negative lens $L_3$ are placed very close to the right hand focal plane of $L_2$ (as seen in FIG. 1) so that they are approximately placed at the focal plane of $L_2$ where the image of $S_1$ is swept about a circle. Because both the source $S_1$ and the aperture in stop 20 are quite small, all of the light emerging from the aperture in stop 20 is actually confined to a narrow beam of light rays which moves in space to generate the surface of a cone between the aperture in stop 20 and the lens $L_2$ as noted by dotted lines 24 in FIG. 1. Because the aperture is in the left hand focal plane of $L_2$, the refracted rays emerging from $L_2$ will sweep out the surface of a cylinder between $L_2$ and the unknown lens as indicated by dotted lines 26 in FIG. 1 and as should now be apparent.

Lens $L_3$ has been chosen as a negative lens of known focal length, e.g., minus 50 millimeters (that is minus 20 diopters). Suppose now that the unknown lens $L_x$ were plus 20 diopters, then $L_3$ and the unknown lens $L_x$ would exactly cancel each other and the light would continue on undeviated (to at least a first approximation) until it swept out a circle in the plane of the ruling 28 which is located just in front of $L_4$ in FIG. 1.

The ruling 28 is rotated by some means such as a motor 29 and comprises a set of alternately opaque and transparent lines spaced closely enough that, when the unknown lens is plus 20 diopters, the swept circle of refracted light crosses at least several lines on the ruling. As the spot sweeps past each transparent line, light passes through the ruling and through lens $L_4$ which forms an image of $L_3$ in the plane of the photodetector 30. Therefore, as the spot of light refracted through the unknown lens $L_x$ and known lens $L_3$ combination sweeps around its path on the ruling 28, it crosses over transparent and opaque lines thus producing a series of electrical signal pulses at the output of detector 30 on line 32 with each pulse corresponding to one crossing of a transparent line by the moving spot of light.

If the unknown lens is a negative spherical lens of minus 20 diopters, the rays emerging from $L_3$ will diverge as shown by dotted lines 34 to scan out a larger circle on the ruling surface. Therefore, on each revolution of the mirror 16 (and hence one revolution of the moving incident light beam around the cylinder 26) a number of pulses will occur at the detector output on line 32. Specifically, the number of pulses occurring on line 32 during each mirror revolution (i.e., revolution of the incident light beam) is related to the dioptic power of the unknown lens by the following relationship:

$$D = K_1 (N + K_2)$$

where $K_1$ and $K_2$ are constants, $N$ is the number of pulses on line 32 and $D$ is the power of the unknown lens in diopters. Therefore, a counter for counting the number of pulses per revolution and a converter to perform the necessary algebraic operations indicated in the above equation will give, as an output, the power of an unknown spherical lens.

The exemplary emodiment shown in FIG. 1 includes a 1 pulse per revolution detector 36 associated with the revolving mirror 16 such that one pulse is produced on line 38 at a given reference position during each revolution of the mirror 16. The detector 36 may comprise any kind of conventional reference detecting device such as for instance the detection of a magnetic reference spot or an optical spot. Of course, any other detection of some reference mark which is detectable in ressponse to each revolution of the mirror 16 corresponds to one revolution of the incident light beam about the cylinder.

A similar kind of one pulse per revolution detector 40 is associated with the rotatable ruling 28. The drive means for the rotatable ruling 28 is shown as motor 29 but could comprise any other conventional drive means as should be appreciated by those in the art. Accordingly, one pulse will appear on line 42 for each revolution of the ruling 28. Of course, as previously discussed, the rate of revolution for the mirror 16 (and hence of the incident light beam about the cylinder 26) is much faster than the rotational rate of the ruling 28. Accordingly, many more pulses will appear on line 38 than one line 42 in any given time period as should now be appreciated.

Furthermore, the exemplary embodiment in FIG. 1 includes a ruling angle encoder 44 of conventional design. This encoder may provide analog or digital output but is preferably a digital encoder which provides plural digital outputs on lines 46 signifying the instantaneous relative angular position of the ruling 28.

The computer and display apparatus 48 is described in more detail below. However, those in the art will appreciate that many different forms of digital and/or analog computing devices may be adapted for operation according to the principles of this invention and may comprise a part of the computing and display apparatus 48. With respect to the just discussed measurement of spherical lens power, the computer and display apparatus 48 must merely count the number of pulses occurring on line 32 between successive pulses on line 38. In other words, it must count the number of photodetector output pulses occurring during one revolution of the incident light beam around path 26. To this number, a constant $K_2$ is added and then the result is multiplied by a constant $K_1$ to come up with a direct output 50 of the spherical lens power. Of course, as will be discussed in more detail below, when the unknown lens $L_x$ contains cylindrical and/or prism power as well as spherical power the process is slightly more involved.

That is, if the lens contains non-zero cylindrical power, the pattern swept out on the plane of the ruling 28 will not be a perfect circle but will instead be an ellipse as should be appreciated by those in the art when due consideration is had for the refracting properties of a sphero-cylindrical lens system operating upon the incident cylinder of light 26. The major axis of the resulting ellipse will be parallel to the axis of the cylindrical component of the lens and the length of the major and minor axes will depend upon the power of the lens both along the cylinder axis and at right angles to it according to the same equation as above stated. Therefore, the power of the cylinder component of the lens can be found by subtracting the powers manifested by the two axes of the ellipse and the angle can be determined by finding the angle of the major axis of the ellipse. Actually, the purely spherical lens previously discussed in this simplified example is merely a special case in which the cylindrical power is zero such that the major and minor axes of the ellipse are equal as should now be appreciated.

As previously discussed, the ruling 28 is continuously rotated but at a rate much slower than the rate of mirror rotation. For instance, the rotating beam of incident light may be rotating at approximately 6,000 rpm while the ruling 28 is rotated at approximately 2 revolutions per second. Under these conditions, and assuming that the lens $L_x$ under test has both spherical and cylindrical components of power, the beam of refracted light will trace out an ellipse in the plane of the ruling such as shown at 100 in FIG. 2. As the ruling 28 is slowly rotated there will be a particular instant in time when the lines 102 of the ruling are aligned parallel to the major axis of the ellipse as is shown, for instance, in FIG. 2. At that particular relative angular position, the number of photodetector pulses output on line 32 per revolution of the incident light beam will be at a minimum and will be directly proportional to the length of the minor axis of the ellipse. On the other hand, when the ruling 28 has rotated 90° from the position shown in FIG. 2 (such that the minor axis of the ellipse is aligned with the ruling), the resulting count per revolution of the light beam will be proportional to the length of the major axis of the ellipse and therefore at a maximum value.

Figure 2:
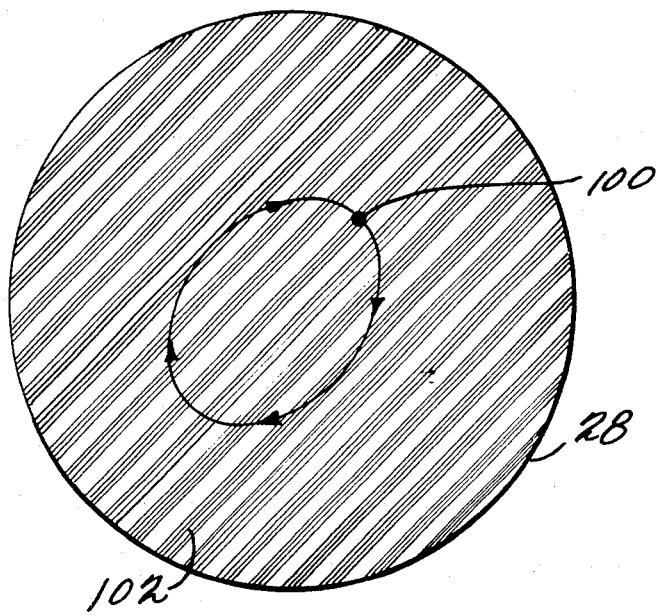
FIG. 2 is a drawing depicting the scan path of refracted light on a ruling of the embodiment shown in FIG. 1.

Accordingly, the computing and display apparatus 48 must perform the following operations in order to read the spherical and cylindrical power of an unknown lens as well as the axis of its cylinder. Firsst of all, as the ruling is slowly rotated while the mirror spins rapidly, the total number of pulses produced on line 32 from the photodetector for each complete revolution of the mirror 16 is counted and stored. When this count is at a maximum, that value is transferred to a storage register where, after conversion according to the above equation, the spherical power of the lens may be indicated as an output such as at 50 in FIG. 1. On the other hand, when the count is at a minimum value the count may be subtracted from the previous maximum count with the resulting difference being converted (according to the above equation) into a measurement of the cylinder power. Furthermore, as previously noted, at the point in time when the maximum and/or minimum numbers are detected, the major and minor axes of the ellipse are oriented in a predetermined fashion with respect to the ruling 28. Accordingly, the cylinder axis or major axis of the ellipse may be measured relative to the apparatus by noting the relative angular position of the ruling 28 when the maximum and/or minimum reading is observed, the major axis of the ellipse and hence the cylinder axis of the test lens $L_x$ is aligned with the ruling lines as shown in FIG. 2.

Accordingly, it will now be seen that the cylinder power output 52 and cylinder axis output 54 as well as the spherical power output 50 may all be determined and output from the computing display apparatus 48 in this first mode of operation for the examplary embodiment shown in FIG. 1.

Two further parameters of the lens $L_x$ remain to be determined. Namely, the prism power and prism axis or angle. The prismatic power of the lens $L_x$ causes the rays passing through it to bend at an angle which defines the power of the prism and in a particular direction which defines the axis of the prism.

To measure these two lens parameters, the apparatus shown in FIG. 1 is operated in a second mode whereby the source $S_1$ is extinguished and the source $S_2$ is instead turned on. Source $S_2$ is actually optically equivalent to $S_1$ except that its light is not reflected from the spinning mirror 16 and it is aligned such that its light output passes along the optical axis of the system.

Accordingly, if the unknown lens has zero prism power, the light rays coming from $S_2$ will strike the ruling at its center of rotation and, as the ruling continues to rotate, no pulses will be output from the photodetector 30. However, if there is prism power in the unknown lens $L_x$, the resulting refracted light beam will strike the ruling 28 at some distance from the axis of rotation such that as the ruling rotates the number of ruling lines 102 which pass under the spot will be directly proportional to the angle through which the prism has deviated the incident beam of light. Therefore, the photodetector output on line 32 for one complete revolution of the ruling 28 is directly proportional to the prism power.

Furthermore, as the ruling 28 is rotated, the time interval occurring between successive signal pulses on line 32 will change in a sinusoidal fashion being at a maximum when the lines of the ruling are moving perpendicular to an imaginary line drawn between the spot of light and the rotational center of the ruling 28. Therefore, to determine the angle or axis of the prism component of the lens, the inter-pulse time interval is monitored as the ruling revolves and the angle of the ruling 28 at which the inter-pulse interval is a maximum may be taken as a measurement of the angle of the prism or prism axis.

The relative angle of a perpendicular to the ruling lines 102 when the inter-pulse interval is at a maximum would be the actual angle relative to the apparatus of the prism or prism axis while the inter-pulse interval would be at a minimum when the ruling lines 102 were aligned with the prism axis as should now be appreciated. Accordingly, it is now apparent that if the apparatus is operated in the second mode of operation, the computing and display apparatus 48 of the embodiment shown in FIG. 1 may determine the prism power and prism axis and provide outputs 56 and 58 respectively indicating these lens parameters. The computing and display apparatus 48 may further have some start switch or actuator 60 as well as a function selector 62. Once the unknown lens is inserted in the machine, the start switch 60 is pushed or otherwise activated whereupon all or some selected ones of the outputs 50-58 are automatically produced. The function selector switch 62 is included for selecting a sub-set of the 5 lens parameters for computation and display purposes.

Besides merely measuring and displaying the 5 lens parameters as previously discussed, the invention herein described may also be used to directly mark on the measured lens $L_x$ exactly where its optical center is located and the location of the cylinder and prism axes. Such markings on the unknown lens $L_x$ are often required. For example, an optician begins with a large round lens ground to some particular spherical and cylindrical power. He must then grind the edges of this lens down so that it fits into a patient's spectacle frames. Therefore, it is obvious that he must know how the cylindrical component of the lens is oriented. With the conventional lensometer, he does this by looking into the eye piece, rotating the lens until its cylindrical axis is horizontal and then activating a mechanical system that places dots of ink on the lens along a horizontal line.

The optician must also usually locate the optical center of the lens which may not be at its mechanical center. If the prescription he is filling requires no prism (as is usually the case), then he must put the optical center of the lens at the place that will be directly in line with the patient's pupil when the glasses are worn. If the prescription requires some non-zero amount of prism, he must shift the optical center of the lens accordingly with respect to the pupil. For strong prism powers the prism component must actually be ground into the lens, but for the more usual cases, i.e., prisms that are weak relative to the spherical power, decentering the lens is usually sufficient.

Besides measuring the 5 lens parameters previously discussed, for example, exemplary embodiment shown in FIG. 1 may also be utilized for automatically marking the center of the lens and the axis of the cylinder and prism.

The portion of the device previously described in FIG. 1 automatically determines the relative angle of the cylinder or cylinder axis with respect to some arbitrary reference such as the horizon. Thus, to mark the cylinder axis, a conventional marking device may be rotated automatically by a servo driven motor until its angle is the same as the readout angle on output 54 whereupon the marker system can be activated. Alternatively, the lens can be rotated in a servo system until its axis output on line 54 reads "zero" whereupon the horizontal marker system can again be activated. In any event, this requires a conventional servo drive mechanism 64 for driving either a conventional lens marking device 66 which then marks the lens $L_x$ as previously discussed and/or where a conventional servo drive mechanism 64 actually rotates the lens $L_x$ until the output on line 54 is nulled whereupon the conventional lens marker 66 is activated.

An exactly similar kind of servo drive mechanism 68 and lens marker 70 may be utilized for marking the prism axis as the function of the output on line 58 as should now be apparent. Of course, different colors of ink and/or other kinds of differentiating characteristics may be incorporated in the marks made by devices 66 and 70 so that the cylinder axis may be easily differentiated from the prism axis.

Furthermore, the optical center of the lens may be determined through a servo mechanism and marking device while the embodiment of FIG. 1 is operating in the second mode. That is, when $S_2$ is turned on for the measurement of prism power and axis, the lens holder holding unknown lens $L_x$ may be mounted on a conventional platform (not shown) that can be driven in two dimensions, i.e., rotation about the optical axis of the instrument and translation within a plane perpendicular to the optic axis. The motor which rotates the platform should be driven in a servo loop including a conventional servo drive 72 which first uses the prism axis output on line 58 to rotate the platform until the prism axis signal 58 is zero thus aligning the prism horizontally. Next, the servo system 72 utilizes the prism size or prism power signal 56 to translate the lens holder in appropriate directions to reduce the prism power indicated on output 56 to zero. When both these servo loops are nulled, the optical center of the lens should be coincident with the optical axis of the lensometer and the prism angle should be zero (unless some prism component is actually ground into the lens) whereupon a conventional marker system 74 may be activated as should now be apparent for marking the optical center of the lens.

Figure 3:
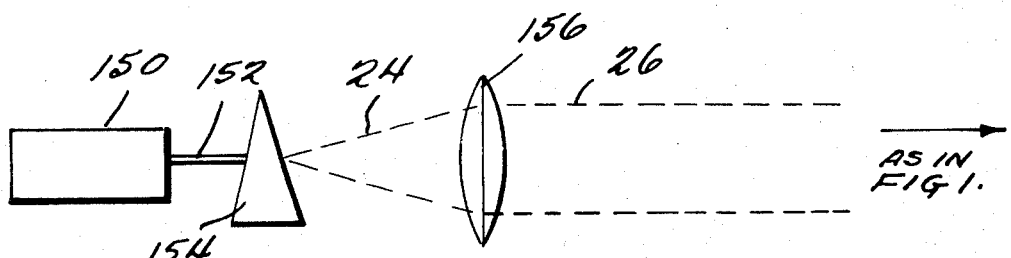
FIG. 3 depicts an alternate exemplary embodiment for a part of the apparatus shown in FIG. 1.

An alternate embodiment for driving the rotating beam of incident light to trace out the cylindrical surface 26 is shown in FIG. 3. Here, a laser source 150 generates an intense and very narrow beam of collimated light analogous to a very intense point source of light and a very small short focal length lens at its focal distance from the source to yield a narrow beam of parallel light rays as will be appreciated by those in the art. This incident laser beam 152 passes through a small deviation optical prism 154 which is spun rapidly (e.g., 6,000 rpm) about the optical axis of the system thus causing the laser beam to sweep out a conical path 24 with the prism at its apex. This swept cone of light then passes through a positive lens 156 located one focal length distance from the prism 154 to thus convert the swept cone of light 24 into the swept cylinder of light 26. The remainder of the system shown in FIG. 1 would, of course, operate as previously described for the first mode of operation. For the second mode of operation wherein the prism power and axis are measured, the small deviation prism 154 may be simply pulled out of the optical path which, of course, essentially reduces the diameter of light cylinder 26 to zero. If desired, a very small hole may be drilled in the center of the positive lens 156 to insure that the laser beam passing therethrough is not unnecessarily spread.

Figure 4:
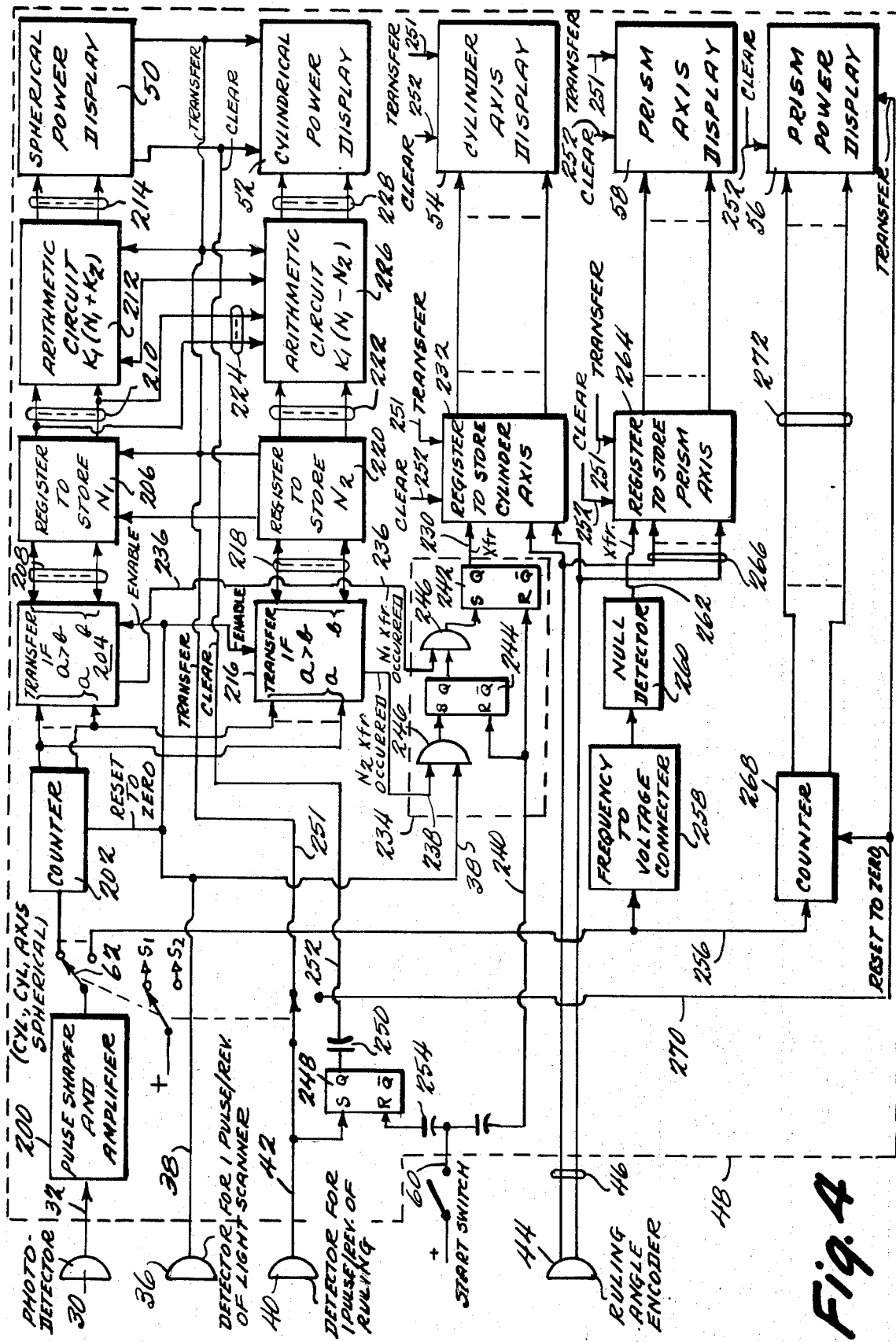
FIG. 4 is a schematic diagram of one exemplary embodiment of the computer and display apparatus shown in FIG. 1.

An exemplary embodiment of the computing and display apparatus 48 is shown in more detail at FIG. 4; however, it should be readily apparent that there are many equivalent ways of performing such calculation. Here, the photodetector output on line 32 is input to a conventional pulse-shaper and amplifier 200. The output therefrom is passed through a function selector switch 62 which is shown in its upper position for operation in the first mode wherein the cylinder power, cylinder axis and spherical power of the unknown lens are to be measured. If the function selector switch 62 is moved to its lower position, the computing apparatus would be operated in the second mode of operation to measure the prism power and axis of the unknown lens. Of course, the selector switch 62 also includes other banks of switches for switching such things as the light sources $S_1$ and $S_2$ etc., as shown in FIG. 4.

In the first mode of operation with selector switch 62 in the position shown in FIG. 4, the output pulses from the photodetector are, after conventional pulse shaping and amplifying, directly input to a digital counter 202. The counter 202 is reset to zero once each revolution of the swept incident light beam by the signal from line 38. Of course, as those in the art will appreciate, the signal directly output on line 38 from the one pulse per revolution detector 36 may be passed through similar pulse shaping and amplifier circuits as the output from photodetector 30 if desired.

Accordingly, the counter 202 will count successive ones of the photodetector outputs and accumulate this count until being reset by the next reference pulse coming from the detector output on line 38. In other words, the counter 202 will count the number of photodetector pulses occuring during each successive rotation of the incident light beam.

Each time the counter 202 is reset, a digital comparator 204 is enabled to compare the contents $a$ of the counter 202 with the contents $b$ of a storage register 206. If the contents $a$ of the counter 202 are greater than the contents $b$ of the storage register 206, the comparator 204 transfers the contents $a$ of the counter 202 into the storage register 206 over lines 208.

Accordingly, after one complete revolution of the ruling 28, the storage register 206 will have stored therein the maximum number of photodetector pulses $N_1$ occurring during any given revolution of the incident light beam. Thus, when a transfer pulse is presented over line 42 (output from the detector 40 signifying the completion of one revolution of the ruling 28) and transfer line 251, the maximum number $N_1$ is available and output on lines 210 to a conventional arithmetic circuit 212 which adds the constant $K_2$ (preset and entered) and multiplies the result by a constant $K_1$ (also preset and entered).

Of course, those in the art will appreciate that the arithmetic circuit 212 may comprise two digital data registers for digitally storing the constants $K_1$ and $K_2$ together with appropriate digital circuitry for carrying out the arithmetical processes described by the above equation. An external or internal clock source may be required for these purposes as will be appreciated.

The output of the arithmetic unit on lines 214 is then a digital indication of the spherical power which is displayed on a conventional digital display unit 50 such as an array of light emitting solid state elements, Nixie tubes, etc.

The output of the counter 202 is also input to another comparator 216 used for detecting the minimum number $N_2$ of pulses occurring during any single revolution of the incident light beam within one complete revolution of the ruling 28. Accordingly, the contents of the counter 202 are transferred over lines 218 to a storage register 220 only if the contents $a$ of the counter 202 are less than the contents $b$ of the storage register 220. In this manner, after one complete revolution of the ruling 28, the storage register 220 contains the minimum number $N_2$ of pulses occurring during one revolution of the incident light beam.

The output of the storage register 220 is then input over lines 222 (together with the output $N_1$ of storage register 206 on lines 224) to another arithmetic unit 226 which subtracts $N_2$ from $N_1$ and multiplies the result by the constant of proportionality $K_1$. Accordingly, the digital output of the arithmetic circuit 226 on lines 228 represents the cylindrical power of the unknown lens which may then be displayed by conventional digital display apparatus 52 as will be appreciated by those in the art.

As should now be appreciated, the constants $K_1$ and $K_2$ will be functions of the specific design details of the apparatus such as the number of rulings per unit distance, the distances and powers of known lenses involved, etc., and will be finally determined upon calibrating any given machine.

As previously discussed, when the minimum number $N_2$ is detected, the major axis of the ellipse will be aligned with the ruling as shown in FIG. 2. Accordingly, at this point the digital output on line 46 of the ruling angle encoder 44 will represent the cylinder axis. Accordingly, all that is needed is some indication of exactly when this minimum number $N_2$ is being detected so that a signal may be provided on line 230 to a storage register 232 to cause transfer of the encoder output on line 46 into the register 232. Thereafter, the cylinder axis may be displayed directly as on some conventional apparatus 54 as now should be apparent and as shown in FIG. 4.

Figure 5:
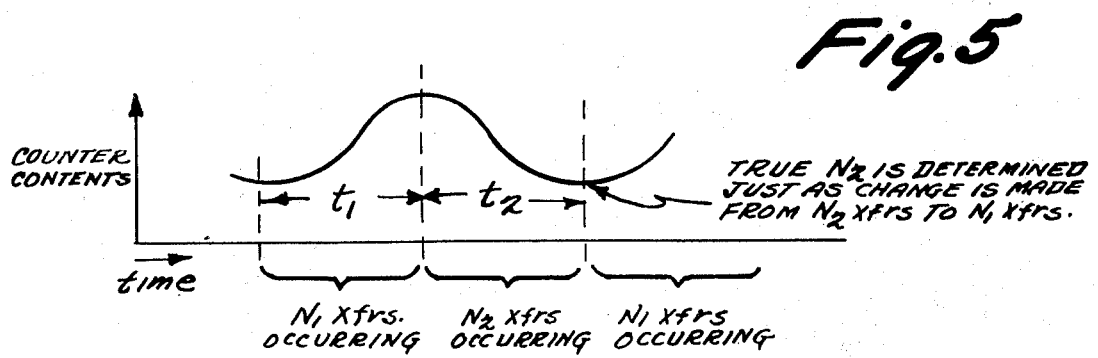
FIG. 5 is a graph useful in explaining the operation of a portion of the circuit shown in FIG. 4.

To help explain how this transfer signal on line 230 is generated, reference should first be made to FIG. 5 where the contents of counter 202 are shown graphically as a function of time. As should now be appreciated, the counter contents will vary between some minimum and maximum values as the ruling 28 is rotated. During time period $t_1$ when the counter contents is increasing, transfers will continually be made from the counter 202 to storage register 206. On the other hand, during the time period $t_2$ when the counter contents is decreasing, transfers will be occurring for the minimum number $N_2$ into register 220. Since it is desired to determine the point in time when the minimum counter contents $N_2$ is achieved, we want to detect the first $N_1$ transfer which occurs after an $N_2$ transfer.

Appropriate logic for achieving this desired detection is shown within dotted lines 234 in FIG. 4. Here, a transfer pulse on line 236 occurs each time an $N_1$ is made while a transfer pulse on line 238 occurs each time an $N_2$ transfer takes place. The relatively high frequency pulses on line 38 are utilized as a convenient source of clock pulses while the signal on line 240 will be a pulse resulting from a start signal on line 60 as should now be apparent from FIG. 4.

Accordingly, as time progresses from an arbitrary starting point, the flip-flop 242 will be reset and temporarily remain in its reset state while the flip-flop 244 will initially also be reset but will then be set as soon as an $N_2$ transfer occurs simultaneously with a clock pulse on line 38. Thereafter AND gate 246 will be enabled by the Q output of flip-flop 244 such that upon the next occurrence of an $N_1$ transfer (as signified by a pulse on line 236), the flip-flop 242 will be set to provide a Q output on line 230 which is the required transfer pulse for transferring the cylinder axis measurement into the storage register 232 as previously described.

The flip-flop 248 shown in FIG. 4 is associated with the start signal on line 60 to insure initial synchronization of the computing apparatus. For instance, in the absence of any start signal, the flip-flop 248 will have been set by some previous pulse on line 42 and will remain with a Q output. However, because of the capacitor 250, no clear pulses will be appearing on line 252 as should be apparent. However, when a start signal on line 60 is provided, flip-flop 248 will be initially reset through the output capacitor 254 as should be apparent from FIG. 4. Thereafter, the next pulse on line 42 will set flip-flop 248 to result in a step function at the Q output thereof and consequently, a pulse is passed through capacitor 250 to result in a clear signal on line 252 to thus initially condition the computing equipment to begin a computation cycle in synchronism with the rotation of the ruling 28.

As previously explained, the angular position of the ruling 28 as indicated by the digital signals on line 46 is also indicative of the prism axis in the second mode of operation when switch 62 has moved to its lower position and when the inter-pulse interval between pulses appearing on the output of the photodetector 30 is at a predetermined limit of change. More specifically, when the inter-pulse interval is at a maximum, the ruling lines are perpendicular with the prism axis. Of course, the maximum inter-pulse interval corresponds to a minimum frequency for the pulses output from the photodetector 30. Accordingly, when the switch 62 is moved to its lower position in the second mode of operation, the pulse string at the output of the photodetector 30 is input along line 256 into a frequency-to-voltage converter 258. The null or other conventional minimum signal detector 260 then indicates when the inter-pulse interval is at a maximum (corresponding to a minimum voltage from the frequency to voltage converter) and generates

What is claimed is:

1. Apparatus for measuring refractive properties of an optical system, said apparatus comprising:
    source means for directing an incident beam of light rays onto said optical system,
    a rotatable ruling disposed to intercept a refracted light beam passing from said optical system,
    photodetector means disposed to intercept the refracted light beam after it has been chopped by said ruling as a result of relative motion between said refracted light beam and said ruling to thereby produce signal pulses, and
    computation means for analyzing said signal pulses over one revolution of said ruling to provide a quantitative measure of at least one refractive property of said optical system, and wherein
    said source means comprises drive means for rotating said incident beam at a predetermined radius to sweep out a cylindrical surface with the incident beam.

2. Apparatus as in claim 1 wherein said drive means comprises:
a rotationally driven plane mirror having its reflective plane oriented at an angle other than exactly 90° with respect to the rotational axis,
a partially silvered mirror disposed for directing a light beam onto said rotationally driven mirror and for passing a resulting rotating beam of light as it is reflected from the driven mirror,
collimating means disposed for collimating said resulting rotating beam of light,
stop means having an aperture disposed for passing a predetermined portion of the collimated rotating beam of light coming from said collimating means such that a conical surface is swept out with the cone apex being located at said aperture, and
further lens means for refracting the swept cone of light into a swept cylinder of light thereby producing said incident beam.

3. Apparatus as in claim 1 wherein;
said source means comprises a laser for providing a first beam of light,
a rotating prism for refracting said first beam to sweep out a conical surface in space, and
lens means for refracting the conically swept beam into a cylindrically swept beam of light thereby producing said incident beam.

4. Apparatus as in claim 1 wherein said computation means comprises:
counting means connected to count the signal pulses produced by said photodetector means during one revolution of said incident beam,
comparison and storage means connected to said counting means for determining the maximum and minimum numbers of the counted signal pulses occurring over one revolution of said ruling,
means for calculating and displaying the spherical power of said optical system based on at least one of the said maximum and minimum numbers,
means for calculating and displaying the cylindrical power of said optical system based on the difference between said maximum and minimum numbers, and
means for calculating and displaying the cylinder axis of said optical system based on the angular position of said ruling which exists at the time that at least one of said maximum and minimum numbers is detected.

5. Apparatus as in claim 1 wherein said computation means comprises:
counting means connected to count the signal pulses produced by said photodetector means during one revolution of said incident beam,
comparison and storage means connected to said counting means for determining the maximum and minimum numbers of the counted signal pulses occurring over one revolution of said ruling, and
means for calculating and displaying the cylindrical power of said optical system based on the difference between said maximum and minimum numbers.

6. Apparatus as in claim 1 wherein said computation means comprises:
counting means connected to count the signal pulses produced by said photodetector means during one revolution of said incident beam,
comparison and storage means connected to said counting means for determining the maximum and minimum numbers of the counted signal pulses occurring over one revolution of said ruling, and
means for calculating and displaying the cylinder axis of said optical system based on the angular position of said ruling which exists at the time that at least one of said maximum and minimum numbers is detected.

7. Apparatus as in claim 6 further comprising:
marking means disposed for physically marking said optical system, and
servo control means driven by a cylinder axis measurement output of said computation means for causing relative rotation between said optical system and said marking means until said marking means is aligned with the cylinder axis of the optical system and for thereupon actuating said marking means to mark the relative orientation of the cylinder axis on said optical system.

8. Apparatus as in claim 1 wherein said computation means comprises:
counting means connected to count the signal pulses produced by said photodetector means during one revolution of said incident beam,
comparison and storage means connected to said counting means for determining the maximum and minimum numbers of the counted signal pulses occurring over one revolution of said ruling,
means for calculating and displaying the spherical power of said optical system, based on at least one of the said maximum and minimum numbers,
means for calculating and displaying the cylindrical power of said optical system based on the difference between said maximum and minimum numbers, and
means for calculating and displaying the cylinder axis of said optical system based on the angular position of said ruling which exists at the time that at least one of said maximum and minimum numbers is detected.

9. Apparatus as in claim 1 wherein said drive means is adapted to rotate said incident beam at a rate higher than the rate at which said ruling is rotated, and wherein said computation means further comprises:
a first means for providing a first reference pulse once for each revolution of said incident beam,
a second means for providing a second reference pulse once for each revolution of said ruling, and
an angle encoder means for providing an angle output representative of the instantaneous angular position of said ruling.

10. Apparatus for measuring refractive properties of an optical system under test including the measurement of at least one of the prism power, prism axis, cylinder axis, cylinder power and spherical power properties which are potentially present in a sphero-cylindrical optical system, said apparatus comprising:
source means for directing an incident beam of light rays onto said optical system in a predetermined relative orientation,
a rotatable ruling disposed to intercept a refracted light beam passing from said optical system and originating from said source means,
said ruling including means for providing different numbers of light pulses during relative rotation between the ruling and the refracted light beam with such number being dependent upon at least one of said refractive properties, means for rotating said ruling, photodetector means disposed to intercept the refracted light beam after it has been chopped by said ruling as a result of relative motion between said refracted light beam and said ruling to thereby produce electrical signal pulses in response to said light pulses, and computation means for counting and digitally analyzing the numbers of said electrical signal pulses produced over at least a portion of one revolution of said ruling to provide a quantitative measure of at least one refractive property of said optical system.

11. Apparatus as in claim 10 wherein said source means comprises:

means for statically directing said incident beam towards said optical system.

12. Apparatus as in claim 11 wherein said computation means comprises:

counting means connected to count the signal pulses produced by said photodetector during one rotation of said ruling, and means for computing and displaying the prism power of said optical system based on the number of such counted signal pulses.

13. Apparatus as in claim 11 wherein said computation means comprises:

detection means connected to detect the inter-pulse time interval between said signal pulses, and means for calculating and displaying the prism axis of said optical system based on the angular position of said ruling at the time said inter-pulse time interval reaches a predetermined limit of change.

14. Apparatus as in claim 13 further comprising:

marking means disposed for physically marking said optical system, and servo control means driven by a prism axis measurement output of said computation means for causing relative rotation between said optical system and said marking means until said marking means is aligned with the prism axis of the optical system and for thereupon actuating said marking means to mark the relative orientation of the prism axis on said optical system.

15. Apparatus as in claim 11 wherein said computation means comprises:

counting means connected to count the signal pulses produced by said photodetector during one rotation of said ruling, means for computing and displaying the prism power of said optical system based on the number of such counted signal pulses, detection means connected to detect the interpulse time interval between said signal pulses, and means for calculating and displaying the prism axis of said optical system based on the angular position of said ruling at the time said inter-pulse time interval reaches a predetermined limit of change.

16. Apparatus as in claim 15 further comprising:

marking means disposed for physically marking said optical system, and servo control means driven by prism power and prism axis measurement outputs of said computation means for causing relative rotation and translation between said optical system and said marking means until said marking means is aligned with the optical center of the optical system and for thereupon actuating said marking means to mark the location of said optical center on the optical system.

17. Apparatus as in claim 10 wherein said source means comprises:

drive means for rotating said incident beam at a predetermined radius to thereby sweep out a cylindrical surface with the incident beam, means for statically directing said incident beam towards said optical system, and selection means for selectively activating either one of the two just previously mentioned means.

18. Apparatus as in claim 10 wherein said rotatable ruling comprises alternate bands of contrasting light transmissivity.

19. Apparatus as in claim 10 further comprising:

a lens of predetermined optical characteristics disposed to act in combination with said optical system in refracting said incident beam onto said ruling.

20. A method for automatically measuring refractive properties of an optical system, said method comprising the steps of:

directing an incident beam of light rays onto said optical system, rotating a ruling disposed to intercept a refracted light beam passing from said optical system, chopping the refracted light beam as a result of relative motion between said refracted light beam and said ruling, photodetecting the refracted light beam after said chopping to produce signal pulses, and machine analyzing said signal pulses over one revolution of said ruling to provide a quantitative measure of at least one refractive property of said optical system, and wherein said directing step comprises rotating said incident beam at a predetermined radius to sweep out a cylindrical surface with the incident beam.

21. A method as in claim 20 wherein said analyzing step comprises:

machine counting the signal pulses occurring during one revolution of said incident beam for different angular positions of said ruling, machine comprising the numbers resulting from said counting step to determine the maximum and minimum numbers of signal pulses occurring during one revolution of the incident beam, and machine determining the spherical power of said optical system based on at least one of said maximum and minimum numbers.

22. A method as in claim 20 wherein said analyzing step comprises:

machine counting the signal pulses occurring during one revolution of said incident beam for different angular positions of said ruling, machine comparing the numbers resulting from said counting step to determine the maximum and minimum numbers of signal pulses occurring during one revolution of the incident beam, and machine determining the cylindrical power of said optical system based on the difference between said maximum and minimun numbers.

23. A method as in claim 20 wherein said analyzing step comprises:

machine counting the signal pulses occurring during one revolution of said incident beam for different angular positions of said ruling, machine comparing the numbers resulting from said counting step to determine the maximum and minimum numbers of signal pulses occurring during one revolution of the incident beam, and machine determining the cylinder axis of the optical system based on the angular position of said ruling at the time that at least one of said maximum and minimum numbers occurred.

24. A method as in claim 20 wherein said analyzing step comprises:

machine counting the signal pulses occurring during one revolution of said incident beam for different angular positions of said ruling, machine comparing the numbers resulting from said counting step to determine the maximum and minimum numbers of signal pulses occurring during one revolution of the incident beam, machine determining the spherical power of said optical system based on at least one of said maximum and minimum numbers, machine determining the cylindrical power of said optical system based on the difference between said maximum and minimum numbers, and machine determining the cylinder axis of the optical system based on the angular position of said ruling at the time that at least one of said maximum and minimum numbers occurred.

25. A method for automatically measuring refractive properties of an optical system under test including the measurement of at least one of the prism power, prism axis, cylinder power and spherical power properties which are potentially present in a sphero-cylindrical optical system, said method comprising the steps of:

directing an incident beam of light rays onto said optical system in a predetermined relative orientation, rotating a ruling disposed to intercept a refracted light beam passing from said optical system and originating from said source means, chopping the refracted light beam as a result of relative motion between said refracted light beam and said ruling, providing said ruling with means for providing different numbers of light pulses during relative rotation between the ruling and the refracted light beam with such number being dependent upon at least one of said refractive properties, photodetecting the refracted light beam after said chopping to produce electrical signal pulses in responce to said light pulses, and machine counting and digitally analyzing the numbers of said electrical signal pulses produced over at least a portion of one revolution of said ruling to provide a quantitative measure of at least one refractive property of said optical system.

26. A method as in claim 25 wherein said analyzing step comprises:

machine counting the signal pulses produced during one revolution of said ruling, and machine determining the prism power of said optical system based on the number of such counted signal pulses.

27. A method as in claim 25 wherein said analyzing step comprises:

machine detecting when the inter-pulse time interval between signal pulses reaches a predetermined light of change, and machine determining the prism axis of said optical system based on the angular position of said ruling when said predetermined limit occurs.

28. A method as in claim 25 wherein said analyzing step comprises:

machine counting the signal pulses produced during one revolution of said ruling, machine determining the prism power of said optical system based on the number of such counted signal pulses, machine detecting when the inter-pulse time interval between signal pulses reaches a predetermined limit of change, and machine determining the prism axis of said optical system based on the angular position of said ruling when said predetermined limit occurs.

* * * * *